United States Patent [19]

Bassett

[11] Patent Number: 5,499,683
[45] Date of Patent: Mar. 19, 1996

[54] SOIL TREATING SYSTEM WITH HYDRAULICALLY ACTUATED IMPLEMENT CONTROLLER

[75] Inventor: James H. Bassett, Sycamore, Ill.

[73] Assignee: Dawn Equipment Company, Sycamore, Ill.

[21] Appl. No.: 97,977

[22] Filed: Jul. 27, 1993

[51] Int. Cl.$^6$ .............................. A01C 5/00; A01B 63/00
[52] U.S. Cl. .................. 172/4; 172/239; 172/675
[58] Field of Search ..................... 172/10, 7, 239, 172/315, 675, 78, 4

[56] References Cited

U.S. PATENT DOCUMENTS

| | | | |
|---|---|---|---|
| 2,611,306 | 9/1952 | Strehlow et al. | 172/10 X |
| 3,042,121 | 7/1962 | Broetzman et al. | 172/239 |
| 3,057,092 | 10/1962 | Curlett | 172/239 X |
| 3,110,973 | 11/1963 | Reynolds | 172/239 X |
| 3,123,152 | 3/1964 | Biskis | 172/239 |
| 3,653,446 | 4/1972 | Kalmon | 172/10 X |
| 3,749,035 | 7/1973 | Cayton et al. | 172/4 X |
| 4,044,697 | 8/1977 | Swanson | 172/7 X |
| 4,173,259 | 11/1979 | Heckenkamp | 172/10 |
| 4,301,870 | 11/1981 | Carre et al. | 172/7 |
| 4,499,775 | 2/1985 | Lasoen | 172/7 X |
| 4,508,178 | 4/1985 | Cowell et al. | 172/239 |
| 5,113,957 | 5/1992 | Tamai et al. | 172/10 |
| 5,129,282 | 7/1992 | Bassett et al. | 74/529 |

FOREIGN PATENT DOCUMENTS 1108971  6/1961  Germany ..................... 172/239

Primary Examiner—Terry Lee Melius
Assistant Examiner—Christopher J. Novosad
Attorney, Agent, or Firm—Arnold, White & Durkee

[57] ABSTRACT

A soil treating system having a frame, a first implement to engage soil to effect treatment thereof and mounted to the frame in an operative position in which the implement can be moved vertically relative to the frame, and an hydraulic actuator acting between the frame and implement for exerting a variable downward force on the implement.

15 Claims, 3 Drawing Sheets

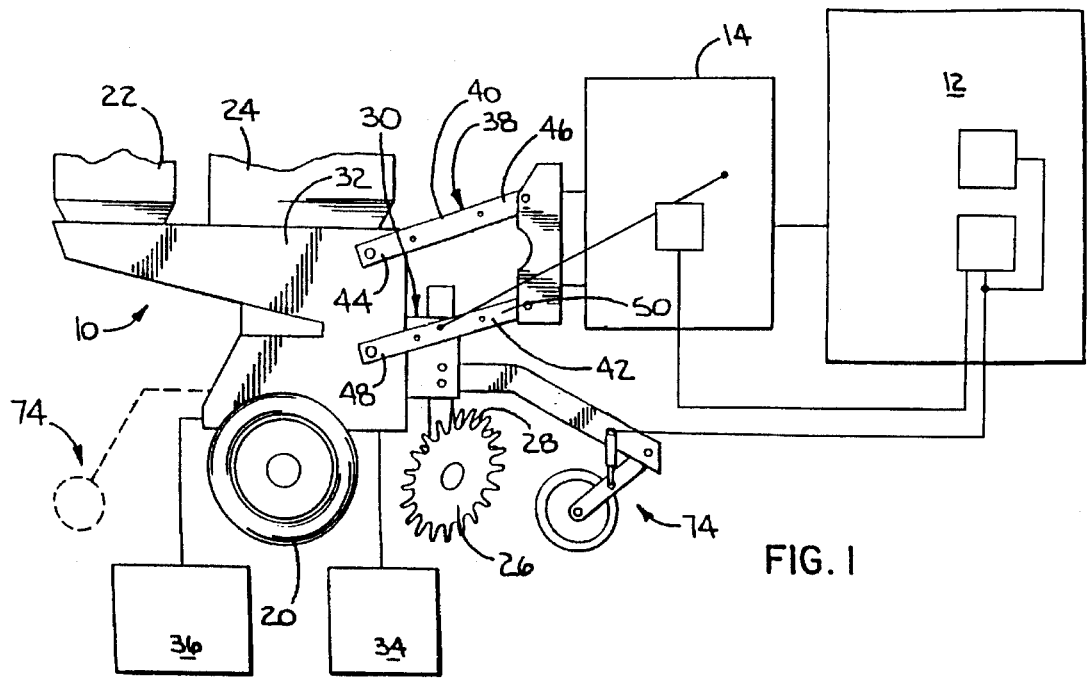
FIG. 1
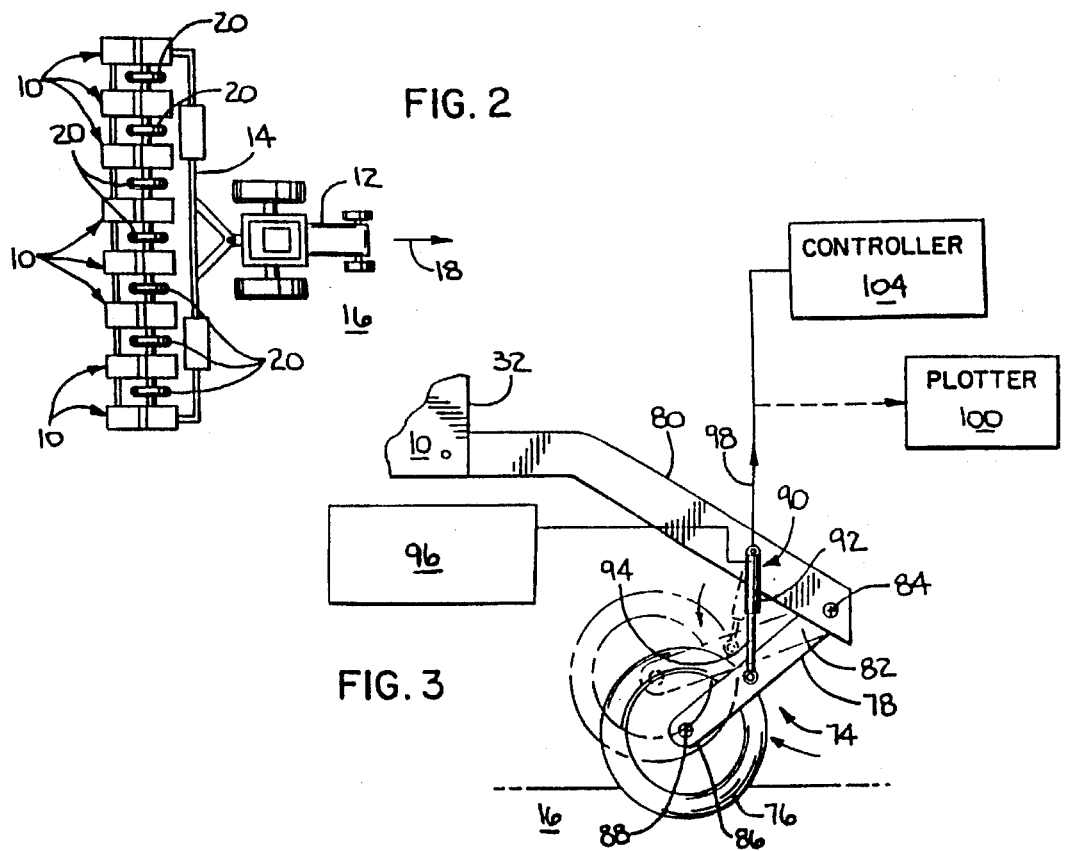
FIG. 2
FIG. 3

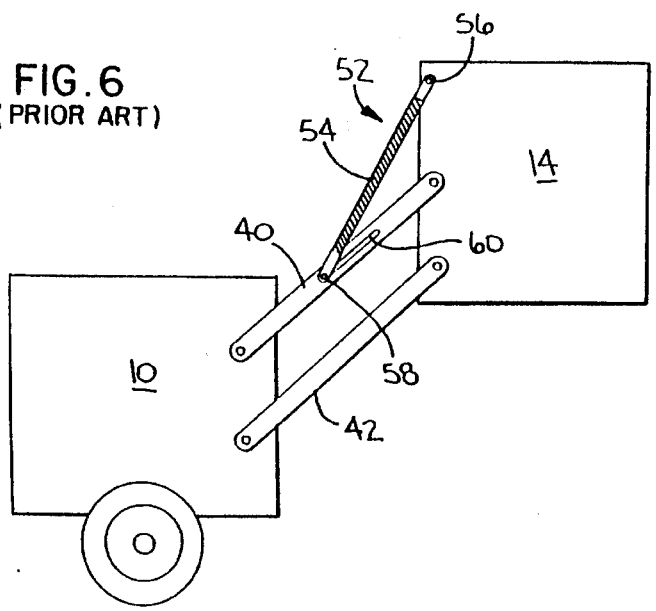
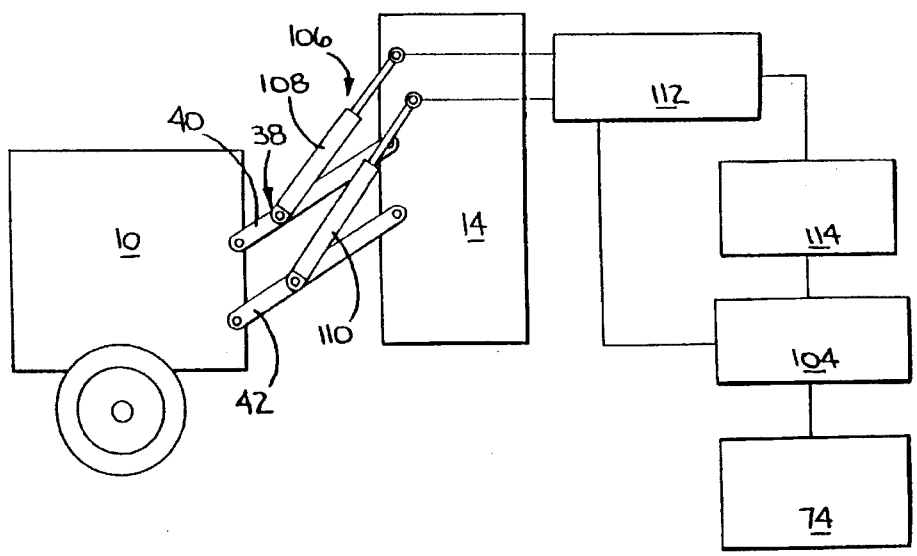

5,499,683

SOIL TREATING SYSTEM WITH HYDRAULICALLY ACTUATED IMPLEMENT CONTROLLER

BACKGROUND OF THE INVENTION

1. Field of the Invention

This invention relates to agricultural implements carried by a towing frame and, more particularly to a system for controllably applying a force that urges the implement downwardly relative to the frame to compensate for different soil conditions.

2. Background Art

A primary objective of the agricultural industry is to optimize field productivity by producing a uniform crop yield throughout an entire field. Yield plotting and other types of field monitoring have allowed farmers to control the application of fertilizer, pesticides, etc. to maximize crop output. Even with the sophisticated monitoring that is presently carried out, the inconsistency in soil hardness has been a prevailing problem that causes a significant variation in crop quality and volume throughout a field.

Several factors contribute to the hardness of soil. For example, the amount and timing of rainfall are major factors in determining soil hardness. Changing of the nature of areas surrounding fields may alter drainage characteristics in the fields. Wind may relocate soil to change the field contour and the soil composition. All of these factors, and others, change the soil hardness from one year to the next and sometimes from one location to the next in the same field. Since most of these factors are unpredictable, it is impossible to prepare in advance for soil conditions that will exist during planting season. Whereas the above monitoring techniques have enabled farmers to compensate for some variables and thereby greatly increase production for a given field, no suitable structure is currently available to effectively compensate for variations in soil hardness.

Typically, agricultural implements are generically designed for a standard soil type. That is, the implements are weighted so that soil penetrating tools, such as fertilizer applicators, soil openers, etc. penetrate the soil a predetermined depth under the overall weight of the implement. A typical implement may weigh on the order of 300 pounds. In exceptionally soft soil, the tools on the implement penetrate a significantly greater amount than is desired, so that the wheels create unwanted trenches, while in particularly hard soil an inadequate amount of penetration of the tools may result. This results in inconsistent depth of seed and fertilizer placement, which may in turn result in significantly different crop quality and yield for different parts of a field.

It is known to produce a downward biasing force on implements to increase the penetrating depth of the tools thereon in harder soils and also to avoid uncontrolled bouncing of the implements, particularly when they are drawn over such harder soils. In one known system, a spring mechanism acts between a rigid carrying frame and a linkage, or other mounting part for the implement, to exert a downward force. Without the ability to vary this added downward force, the farmer solves the penetration problem only for the harder soils and aggravates the problem by causing excessive penetration in the softer soils.

In an attempt to overcome this problem, mechanisms have been devised to adjust spring position as to allow variation in the magnitude of the downward spring force. One such prior art system uses one fixed position spring and one variable position spring in association with each implement. This generally requires that the user manually set, one by one, the adjustable springs associated with each of the implements. Since a multitude of adjustments may actually be required over a given field, adjustment is a time consuming and very inconvenient exercise. As a result, the user may make a compromise adjustment that is adequate for the entire field yet which fails to optimize yield for the harder and softer soils.

To overcome the deficiencies in the last described system, it is known to use a pneumatic system to vary downward pressure on tools. This system requires a separate compressor to be operated by the towing vehicle. If multiple implements are to be simultaneously controlled, an impractically large holding tank would be required. It is inconvenient to have to provide a self-contained air compressing system, which takes up valuable space on the towing vehicle. Further, pneumatic cylinders are normally quite large and may interfere with an operator's access to the implements as may be required to effect adjustments or repairs thereto. In spite of this problem, one agricultural equipment manufacturer uses an air cylinder, such as used as a shock absorber on an automobile, to prevent implement bouncing and exert a downward force on the implements.

Another problem with this system is that the manner of detection of the soil hardness is deficient. The operator is required to "guess" at the hardness of the soil in front of the towing vehicle, based upon the physical appearance thereof and make a relatively crude adjustment in anticipation of encountering this soil. Alternatively, the operator can visually monitor the amount of penetration of the tools behind the towing vehicle and then make an adjustment. However, at this point, a significant amount of the soil will have been treated before the appropriate adjustment can be made. This also requires the constant attention of the operator whose attention is normally required for other important tasks.

While the above described deficiencies in the prior art have been recognized for a long time, for want of any better solution, these systems have generally been practiced and their shortcomings contended with.

SUMMARY OF THE INVENTION

According to the invention, a soil treating system is provided having a frame, a first implement to engage soil to effect treatment thereof and mounted to the frame in an operative position in which the implement can be moved vertically relative to the frame, and an hydraulic actuator acting between the frame and implement for exerting a variable downward force on the implement.

By using an hydraulically operated actuator, the system can be made relatively compact. For example, one or more relatively thin hydraulic cylinders can be used for this purpose.

The invention contemplates the above system in combination with a towing vehicle having an hydraulic system that is operatively connected to the hydraulic actuator for the implement. This obviates the need to provide a separate fluid pressurizing system as is required in conventional pneumatically-operated implements.

For convenience, the force exerting structure can be operated through a control that is either in the cab of the towing vehicle or readily accessible therefrom.

In one form, the implement is mounted using a plurality of links, each pivotably mounted to the implement and frame, with the force exerting structure connected directly to one of the links.

A second implement can be provided to be mounted to the frame in the same manner as the first implement and vertically biased by an hydraulically operated structure acting between the frame and second implement. An accumulator is provided for hydraulic fluid, which accumulator is in communication with each of the first and second force exerting structures.

With this arrangement, the fluid can be highly pressurized in the accumulator for prompt response of the actuators and application of downward pressure on the implements. Normal hydraulic systems for tractors may not have the capacity to operate the actuators without interfering with the basic tractor operation through the hydraulic system.

In one form, the controller for the actuating elements is an electrical control.

Still further, the invention contemplates a soil treating system having a first implement mounted to a frame for vertical movement relative thereto and structure operable by a pressurized fluid and acting between the frame and implement for exerting a downward force on the implement. An accumulator is provided for the pressurized fluid with structure communicating the pressurized fluid from the accumulator to the force exerting structure to effect operation thereof.

The fluid can be one of air, oil or other suitable fluid.

The controller, which may be electrically operated, can be used to control the communication of fluid from the accumulator to the force exerting structure. Preferably, the controller is operable from the vehicle cab.

In still another form of the invention, a soil treating system is provided having a first implement mounted to a frame through a plurality of links connected between the frame and the first soil treating implement to allow vertical movement of the soil treating implement relative to the frame. At least one hydraulic cylinder acts between the frame and soil treating implement for exerting a downward force on the soil treating implement.

The cylinder can be controlled to produce a variable downward force.

In another form, a plurality of hydraulic cylinders are provided with at least one hydraulic cylinder acting on each of two links supporting the implement.

BRIEF DESCRIPTION OF THE DRAWINGS

FIG. 1 is a schematic, side elevation view of a soil treating implement operatively connected to a towing vehicle and with the inventive structure incorporated therein so as to allow sensing of soil hardness and controlled vertical movement of the implement to compensate for variations in soil hardness;

FIG. 2 is a schematic plan view of a towing vehicle operatively connected to a plurality of soil treating implements;

FIG. 3 is an enlarged side elevation view of a soil hardness sensing system on the inventive structure in FIG. 1;

FIG. 6 is a side elevation view of a conventional connection between a soil treating implement and a frame on a towing vehicle with there being structure for biasing the implement downwardly relative to the frame; and FIG. 7 is a view as in FIG. 6 incorporating the inventive structure for biasing the soil treating implement downwardly relative to a frame on a towing vehicle.

DETAILED DESCRIPTION OF THE DRAWINGS

Figure 4:
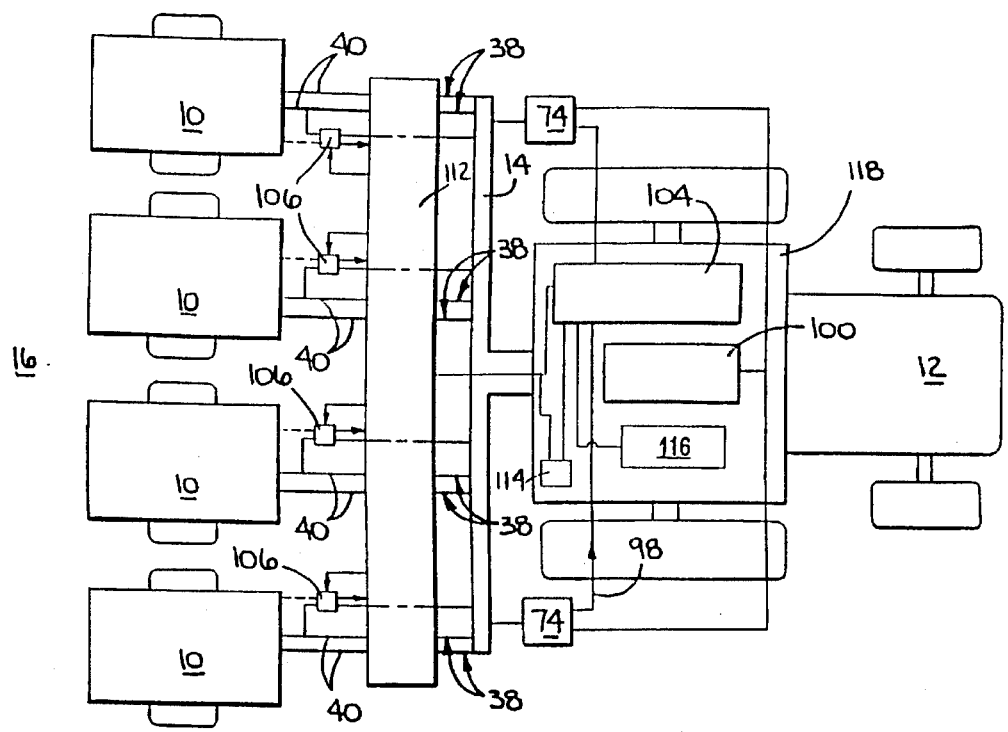
FIG. 4 is a schematic plan view of a towing vehicle operatively connected to a plurality of soil treating implements with the inventive structure incorporated therein.

In FIGS. 1 and 2, the environment for the present invention can be seen. Briefly, the invention is concerned with the connection between a soil treating implement 10 and a towing vehicle 12, which is a tractor, or the like. The tractor 12 is operatively connected to a towing frame 14 to which a plurality of the soil treating implements 10 can be attached in side-by-side relationship to simultaneously treat a substantial width of subjacent soil 16 as the tractor advances in the direction of the arrow 18. The implements 10 have gauge wheels 20 thereon to facilitate travel of the implements 10 through a field.

The precise construction of the implements 10 does not form a part of the present invention. A wide range of implements to perform a multitude of tasks is currently available on the marketplace.

The exemplary implement 10 shown has bins 22, 24 to accommodate fertilizer and seed which are directed by gravity into the soil 16.

A pair of cooperating toothed wheels 26, 28 are mounted on the implement 10 upstream of the point of delivery of the fertilizer and seed from the bins 22, 24. The wheels 26, 28 are arranged in tandem for rotation about transverse axes. The wheels 26, 28 are driven by the underlying soil 15, as the implements 10 are advanced therethrough, and are in mesh to produce a scissors action that breaks up compacted soil and simultaneously clears residue out of the path of planting.

The wheels 26, 28 shown are a type currently sold by the assignee herein under the trademark TRASHWHEEL™. A more detailed explanation of the construction of the TRASHWHEEL™ tools, as well as suitable mounting structure therefor, is set out in my U.S. Pat. No. 5,129,282. Through a mechanism at 30, described more fully in U.S. Pat. No. 5,129,282, the wheels 26, 28 are vertically adjustable relative to a frame 32 on the implement 10.

Between the wheels 26, 28 and the gauge wheels 20, a disc pair, shown schematically at 34, and commonly referred to in the industry as a "V-opener", is provided to separate soil to provide a receptacle for seed. The discs in the disc pair 34 are inclined with respect to each other to produce a desired seed opening. The disc pair 34 is held at a fixed height on the implement 10 so that the depth of the opening defined by the disc pair 34 is determined by the vertical relationship between the disc pair 34 and the gauge wheels 20.

After the seed is introduced into the soil 16, closing discs 36, downstream of the gauge wheels 20, resituate soil over the opening created by the disc pair 34. The height of the closing discs 36 is fixed and also determined by the vertical relationship thereof to the wheels 20.

Consequently, the gauge wheels 20 determine the planting depth for the seed and the height of introduction of fertilizer, etc. The amount of penetration of the soil 16 by the wheels 20, and thus the planting depth, is determined primarily by the weight of the implement 10. The implement 10 is allowed to float vertically relative to the towing frame by connecting the implement 10 to the frame 14 through laterally spaced link pairs 38 (one pair shown). Conventionally, a four-bar linkage is used. The link pair 38 consists of an upper link 40 and a lower link 42. The link 40 has spaced ends 44, 46 pivotably connected to the implement 10 and towing frame 14 for rotation about horizontally extending, parallel axes. The link 42 has corresponding ends 48, 50 connected in like fashion. The links 40, 42 cooperatively define a parallel linkage which allows the implement to positively follow movement of the towing frame 14 while being movable vertically straight upwardly and downwardly within a limited range to follow the contour of the underlying terrain.

Since the implement 10 has a fixed weight, the amount of penetration of the soil 16 by the wheels 20 varies depending upon the hardness of the soil 16. Consequently, harder soil keeps the implement at a higher elevation than softer soil. The result of this is that the seed or fertilizer is introduced by the implement at different heights throughout a field depending upon the hardness of the soil. Even if the soil hardness does not vary, in some fields the soil is sufficiently hard that the implement 10 rides too high thereon so that the disc pair 34 defines too shallow a seed opening and, as a result, the seed is planted too close to the surface of the soil 16.

Different structures have been developed in the prior art to overcome the above problem. One such structure is shown in FIG. 6. In FIG. 6, the implement 10 is shown schematically, as is the towing frame 14 which is used to draw the implement 10. The links 40, 42 are connected to the implement 10 and frame 14 in the same manner as shown in FIG. 1.

A biasing means 52 is provided to develop a downward force on the implement 10. The biasing means acts between the frame and link 40 in such a manner that a downward force component is developed to enhance the downward force attributable to the weight of the implement 10 and to prevent uncontrolled bouncing of the implement over irregular terrain. The biasing means 52 is shown in the form of a spring 54 with upper and lower end fittings 56, 58, respectively, pivotably connected to the frame 14 and implement 10.

A slot 60 is formed on the link 40 to allow lengthwise movement of the end fitting 58 relative to the link 40. This allows variation of the downward force component on the implement 10 attributable to the spring 54.

It should be understood that the description with respect to FIG. 6 is intended to be strictly schematic in nature. However, it does demonstrate the principles of the prior art structures. In one commercially available structure, one fixed spring acts between the frame 14 and one of the links 40, 42, whereas the other spring has the configuration shown in FIG. 6.

The difficulty with the structure in FIG. 6 is that the downward force on the implement 10 must be varied manually and, once set, is fixed. Consequently, if a user determines that soil in a field is harder than normal, the biasing means 52 must be set to produce an appropriate downward force on the implement 10. However, if soil is soft in certain parts of the field, the biasing means 52 forces the implement 10 too deeply into the soil causing the wheels 20 to trench and the seed and fertilizer to be placed too deeply.

Figure 5:
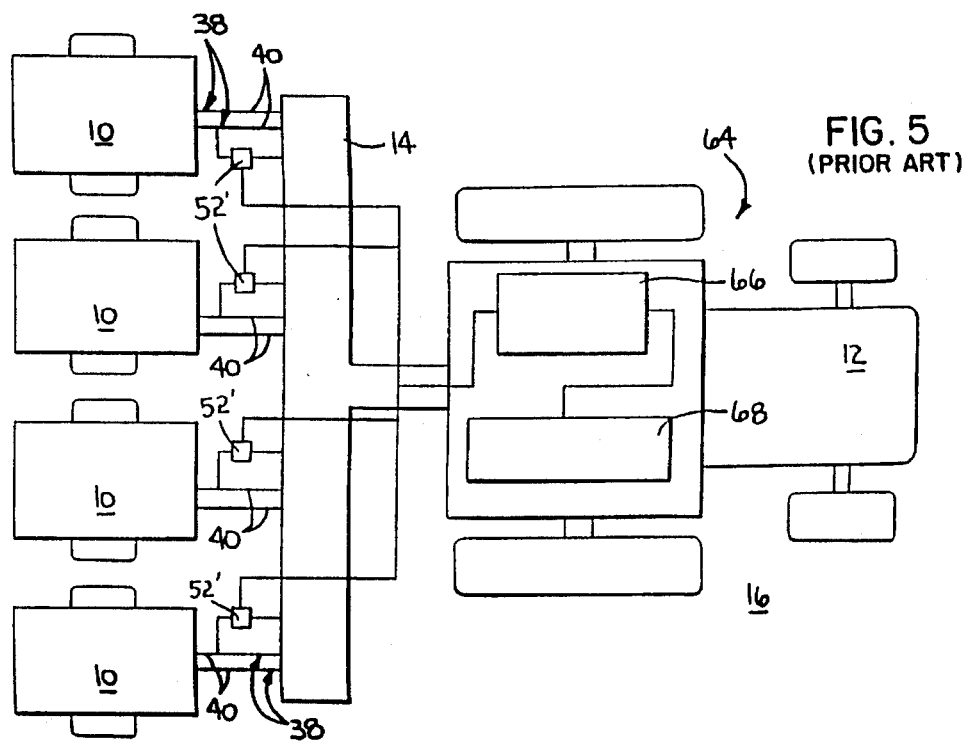
FIG. 5 is a schematic plan view of a towing vehicle operatively connected to a plurality of soil treating implements with a prior art system for varying the downward force on the soil treating implements.

One attempted solution to this problem is shown in the system at 64 in FIG. 5. The system 64 consists of a tractor 12 which is operatively connected to a towing frame 14 which in turn carries a plurality of implements 10. Laterally spaced link pairs 38 connect each implement to the frame as described with respect to the system in FIG. 1.

Biasing means 52' are provided, one each with an implement 10, and act between the towing frame 14 and one of the upper links 40 in the link pair 38.

In the prior art, the biasing means 52' is a pneumatic cylinder that requires a self-contained air compressing system 66 to be carded on, and operated by, the tractor 12. The biasing means 52' are simultaneously operated through a controller 68 to increase or decrease the downward force on the implements 10 through the biasing means 52', as appropriate.

There are several problems inherent in the system 64. First of all, the user must test the soil 16 and determine the amount of downward pressure that is optimum for the implements 10. This may involve trial and error. Since the control 68 therefor may be externally of the tractor 12 the user may have to repeatedly get out of a cab on the tractor 12 to carry out an inspection of the soil 16. The user sets the amount of downward pressure applied through the biasing means 52', works a portion of the field, and then must visually inspect the soil to make certain that the implements 10 penetrate the soil 16 a desired amount.

Another problem is that a pneumatic system 66 that is of a size to fit on a tractor 12 is usually inadequate to cause prompt response of the biasing means 52' to the operator's commands. This may result in a substantial portion of a field being treated improperly due to the slow response time for implement adjustment.

Still further, the pneumatic biasing means 52', which may each be in the form of an extensible cylinder, are required to be relatively large and may impair access to the implement 10 and frame 14 in the vicinity of the link pairs 38. This complicates repair and adjustment of parts that may periodically require attention.

The present invention solves the above problems. As seen in FIGS. 1, 3, 4, and 7, the present invention contemplates the use of a sensing means 74 to allow for continuous monitoring of the soil hardness as the tractor/towing vehicle 12 traverses a field. The sensing means 74 has a sensing element, in this case a wheel 76, that engages the soil 16. The wheel 76 is carried on a link 78 which is in turn mounted to a depending, cantilevered arm 80 on the implement frame 32.

One end 82 of the link 78 is connected to the arm 80 for rotation about a horizontal axis 84. The other link end 86 supports the wheel 76 for rotation about a second axis 88, that is parallel to the axis 84. The link 76 is thus free to pivot in an arc within a predetermined range. As a result of this pivoting, the vertical position of the wheel 76 is variable, as between the solid line position in FIG. 3 and the phantom line position in the same figure.

A means 90 acts between the arm 80 and the link 78 and normally biases the wheel 76 towards a downward position, a shown in solid lines in FIG. 3. The biasing means 90 is in the form of a two-part cylinder with relative lengthwise movement between the parts 92, 94 altering the overall length of the biasing means 90. The biasing means 90 has means 96 thereon for generating a signal that is indicative of the overall length of the biasing means 90, which in turn is indicative of the vertical position of the sensing wheel 76.

In operation, the biasing means 90 exerts a predetermined downward force on the wheel 76. This force is resisted by an upward force exerted by the soil attributable to the weight of the implement 10. The equilibrium position is shown in solid lines in FIG. 3. When softer soil is encountered, the biasing means 90 urges the link 78 in a counterclockwise direction about the axis 84 to lower the sensing wheel 76. This causes a first signal to be generated by the means 96. Harder soil causes the wheel to pivot the link 78 in a clockwise direction about the axis 84, thereby causing the means 96 to generate a different signal, indicative of a different vertical position of the wheel 76.

The signal 98 generated by the means 96 can be used for different purposes. For example, a plotter 100 can receive the signal 98 and continuously map the hardness of the entire field for future use. This allows the farmer to take appropriate steps to either alter the field conditions, through control of drainage, to vary the hardness, or the like, or to treat the hard and soft soil portions differently to maximize crop yield.

Alternatively, the signal 98 can be used to continuously alter the downward force of the implements 10 on the soil 16 as the soil hardness dictates. In this case, the signal 98 is received by an electrical controller 104 that is responsible for controlling operation of the means 106 for producing a variable force on the implements 10. The controller 104 is constructed so that in soft soil, a lesser force is caused to be exerted by the means 106 on the implement 10. More particularly, in soft soil, the wheel 76 penetrates the soil 16 a greater amount. That causes a first signal to be generated by the means 96 which is received by the controller 104 which sends a command to the means 106 to reduce the downward force on the implements 10. In harder soil, the wheel 76 is caused to be elevated, which produces a second signal that is received by the controller 104 which thereby issues a command to increase the downward force applied by the means 106 to the implements 10.

With the inventive system, the soil condition is continuously and automatically monitored. The riding height of the implements 10 is automatically controlled so that seed and fertilizer are delivered to the soil at a uniform depth, regardless of variations in the hardness of soil throughout a field.

In still another aspect of the invention, a compressed fluid system, preferably hydraulically operated, is utilized to control the downward pressure on the implements 10. Hydraulic cylinders 108, 110 act between the frame 14 and the link pairs 38. The hydraulic cylinders 108 are relatively small so as to be unobtrusive. The cylinders 108 can be provided on one or both of the links 40, 42 in the link pair 38 and on one or both of the link pairs 38 associated with each implement 10.

To afford positive response to a signal 98 from the means 96 so as to thereby avoid improper planting, a fluid accumulator 112 is provided. The accumulator 112 is in communication with the hydraulic system 114 for the tractor 12. The controller 104 controls the accumulator 112 to actuate the cylinders 108, 110, to thereby produce the desired downward force on the implements 10. The accumulator 112 can be manually controlled by a valve 116 that is within the tractor cab 118 or at least readily accessible to the operator therefrom.

Since the soil hardness could vary along the width of the gang mounted implements 10, individual sensing means 74 can be provided in association with each implement 10 and the means 106 could be individually controlled for each implement to further optimize seed and fertilizer placement, as a result of which the field yield is maximized.

Another variation contemplated by the present invention is to locate the sensing means in a trailing position relative to the implement 10, as shown schematically phantom lines in FIG. 1.

The foregoing disclosure of specific embodiments is intended to be illustrative of the broad concepts comprehended by the invention.

I claim:
1. A soil treating system comprising:
a frame;
a first implement to engage soil to effect treatment thereof;
means for mounting the first implement to the frame in an operative position in which the first implement can be moved vertically relative to the frame; and
first hydraulically actuated means acting between the frame and first implement for exerting a variable downward force on the implement,
wherein there is a second implement to engage soil to effect treatment thereof, there is a second means for mounting the second implement to the frame in an operative position in which the second implement can be moved vertically relative to the frame and a second hydraulically actuated means acting between the frame and second implement for exerting a downward force on the second implement, an accumulator is provided for hydraulic fluid and means are provided for establishing direct fluid communication between the accumulator and each of the first and second force exerting means.

2. The soil treating system according to claim 1 wherein the first hydraulically actuated means comprises at least one hydraulic cylinder.

3. The soil treating system according to claim 1 in combination with a towing vehicle having an hydraulic system, there being means cooperating between the first hydraulically actuated means and the towing vehicle hydraulic system to allow the first hydraulically actuated means to be operated by the hydraulic system.

4. The soil treating system according to claim 3 wherein the towing vehicle has a cab for an operator and including control means for operating the first hydraulically actuated means, said control means being accessible to an operator in the towing vehicle cab.

5. The soil treating system according to claim 1 wherein the implement mounting means comprises a plurality of links each pivotably mounted to the implement and to the frame and the first hydraulically actuated means is connected directly to one of the links.

6. The soil treating system according to claim 1 in combination with a towing vehicle having a cab for an operator with there being means accessible by an operator within the cab for controlling the pressure of fluid within the accumulator.

7. The soil treating system according to claim 6 wherein said fluid pressure controlling means comprises electrical means.

8. The soil treating system according to claim 1 wherein there are 2–5 additional implements with means for mounting the 2–5 additional implements to the frame in an operative position thereon in which the implements can be moved vertically relative to the frame, and there are hydraulically actuated means acting between the frame and each of the additional implements for exerting a variable downward force on the additional implements.

9. A soil treating system comprising;
a first implement to engage soil to effect treatment thereof;
a second implement to engage soil and effect treatment thereof;
a frame;
means for mounting the first implement to the frame in an operative position thereon in which the first implement can be moved relative to the frame;
means for mounting the second implement to the frame in an operative position thereon in which the second implement can be moved relative to the frame;

first means operated by a pressurized fluid and acting between the frame and first implement for exerting a downward force on the first implement;

second means operated by a pressurized fluid and acting between the frame and second implement for exerting a downward force on the second implement;

an accumulator for a supply of pressurized fluid; and means for selectively communicating pressurized fluid from the accumulator directly to each of the first and second means for exerting a force on the first and second implements to effect operation thereof.

10. The soil treating system according to claim 9 wherein the fluid is one of air and oil.

11. The soil treating system according to claim 9 including means for controlling communication of fluid from the accumulator to each of the first and second means for exerting a force on the first and second implements.

12. The soil treating system according to claim 11 wherein the controlling means comprises electrical means.

13. The soil treating system according to claim 11 in combination with a towing vehicle having a cab for an operator and the controlling means is accessible from the cab of the towing vehicle.

14. The soil treating system according to claim 9 wherein the means for mounting the first implement comprises a plurality of links connected between the frame and the first implement and the first means acting between the frame and first implement comprises a first extendable cylinder acting against one of the links.

15. The soil treating system according to claim 14 wherein the first means acting between the frame and first implement comprises a second extendable cylinder acting against another of the links.

* * * * *